US010542093B2

(12) United States Patent
Ayyagari et al.

(10) Patent No.: US 10,542,093 B2
(45) Date of Patent: Jan. 21, 2020

(54) SURVEILLANCE NETWORK SYSTEM

(75) Inventors: Arun Ayyagari, Seattle, WA (US);
Kevin Y. Ung, Bellevue, WA (US);
Rick Blair, Kent, WA (US); Michael S. Foster, Federal Way, WA (US); David E. Corman, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 13/223,508

(22) Filed: Sep. 1, 2011

(65) Prior Publication Data
US 2012/0084839 A1 Apr. 5, 2012

Related U.S. Application Data

(62) Division of application No. 11/317,634, filed on Dec. 22, 2005, now abandoned.

(51) Int. Cl.
*H04L 29/08* (2006.01)
*H04W 40/30* (2009.01)
*H04W 84/18* (2009.01)

(52) U.S. Cl.
CPC ............. *H04L 67/12* (2013.01); *H04W 40/30* (2013.01); *H04L 2209/805* (2013.01); *H04W 84/18* (2013.01)

(58) Field of Classification Search
CPC ...... H04W 84/18; H04W 40/30; H04L 67/12; H04L 67/28
(Continued)

(56) References Cited

U.S. PATENT DOCUMENTS 5,905,715 A   5/1999   Azarmi et al.
5,929,748 A   7/1999   Odinak
(Continued)

FOREIGN PATENT DOCUMENTS

EP   1 545 069 A   6/2005
WO   WO-03/061175 A   7/2003
WO   WO-2005/043930   5/2005

OTHER PUBLICATIONS

Ding et al., "Localized Fault-Tolerand Event Boundary Detection in Sensor Networks," InfoCom 2005, 24th IEEE Computer and Communications Societies Joint Conference, Mar. 13, 2005, Piscataway, NJ, 12 pgs.
(Continued)

*Primary Examiner* — Tom Y Chang
(74) *Attorney, Agent, or Firm* — Perkins Coie LLP

(57) ABSTRACT

Embodiments of a sensor network system provide surveillance capabilities in multiple contexts/environments (e.g., military, commercial, scientific, civic, urban, wilderness, etc.). Network nodes may include devices such as sensors, network routers, network controllers, etc. Network sensors may be configured so that power management objectives are maximized. Network sensors (both individually and as a group) may be capable of intelligent and cooperative information gathering, so that the output of the sensor network does not contain high levels of irrelevant information. The network nodes may communicate among one another via one or more communication links, and in some cases, multiple routes between any two network nodes may be available. The sensor network may include aspects of both high data rate and low data rate network features. One or more network controllers may provide various network management capabilities, including management of network
(Continued)

routing, information collection, information exportation, network configuration, etc.

28 Claims, 7 Drawing Sheets

(58) Field of Classification Search
USPC .................................................. 709/223, 224
See application file for complete search history.

(56) References Cited

U.S. PATENT DOCUMENTS

| | | | |
|---|---|---|---|
| 6,646,676 B1 | 11/2003 | DaGraca et al. | |
| 7,043,660 B1* | 5/2006 | Bolar | 714/4.5 |
| 7,466,149 B1* | 12/2008 | Yang | 324/700 |
| 2002/0087680 A1* | 7/2002 | Cerami et al. | 709/224 |
| 2003/0026268 A1* | 2/2003 | Navas | H04L 29/12009 370/400 |
| 2003/0033394 A1* | 2/2003 | Stine | H04L 45/02 709/222 |
| 2003/0073406 A1* | 4/2003 | Benjamin et al. | 455/41 |
| 2004/0098395 A1* | 5/2004 | Hisano | G06N 5/022 |
| 2004/0217881 A1 | 11/2004 | Pedyash et al. | |
| 2005/0151087 A1* | 7/2005 | Ueno et al. | 250/370.09 |
| 2005/0183128 A1* | 8/2005 | Assayag et al. | 725/105 |
| 2005/0195769 A1* | 9/2005 | Kaewell et al. | 370/335 |
| 2005/0218218 A1 | 10/2005 | Koster | |
| 2005/0261551 A1* | 11/2005 | Couvillon, Jr. | 600/118 |
| 2005/0288893 A1* | 12/2005 | Gassner | 702/182 |
| 2006/0007008 A1* | 1/2006 | Kates | 340/605 |
| 2006/0025897 A1* | 2/2006 | Shostak et al. | 701/1 |
| 2006/0030318 A1* | 2/2006 | Moore | H04W 48/10 455/434 |
| 2006/0155818 A1* | 7/2006 | Odenwald et al. | 709/208 |
| 2006/0289562 A1* | 12/2006 | Bourget et al. | 222/54 |
| 2007/0103305 A1 | 5/2007 | Bratkovski et al. | |
| 2007/0150565 A1 | 6/2007 | Ayyagari et al. | |
| 2007/0198675 A1* | 8/2007 | Amanuddin et al. | 709/223 |
| 2007/0247366 A1* | 10/2007 | Smith et al. | 342/464 |
| 2007/0263628 A1* | 11/2007 | Axelsson | H04L 45/00 370/392 |

OTHER PUBLICATIONS

European Search Report for Application No. 080181609.1, Applicant: The Boeing Company; dated Jan. 13, 2009 (5 pages).
European Search Report for Application No. 08018658.8; Applicant: The Boeing Company; dated Dec. 17, 2008 (7 pages).
Gatani et al., "Monitoring Wireless Sensor Networks Through Logical Deductive Processes," IEEE Military Communications Conference 2005, Oct. 17, 2005, Piscataway, NJ, 6 pgs.
Hu et al., "Secure Affregation for Wireless Networks," IEEE Applications and the Internet Workshops 2003 Proceedings, Jan. 27, 2003, Piscataway, NJ, 8 pgs.
International Search Report for Application No. PCT/US2006/043573; Applicant: The Boeing Company; dated Jul. 19, 2007 (7 pages).
Iqbal et al.; "LACON: Localized Autonomic Configuration in Pervasive Sensor Networks;" IEEE Intelligent Sensors, Sensor Networks, and Information Processing Conference 2004; Dec. 14, 2004; Piscataway, NJ; 6 pgs.
Modukuri et al., "Autonomous Middleware Framework for Sensor Networks," IEEE Pervasice Services ICPS '05 Proceedings, Jul. 11, 2005, Piscataway, NJ, 10 pgs.
Provan et al., "Model-Based Fault Tolerant Control Reconfiguration for Discrete Event Systems," IEEE International Conference on Control Applications 2000, Sep. 25, 2000, New York, NY, 6 pgs.
Smart Dust, Autonomous sensing and communication in a cubic millimeter, http://robotics.eecs.berkeley.edu/~pister/SmartDust/; accessed Sep. 6, 2005; 5 pgs.
Written Opinion for Application No. PCT/US2006/043573; Applicant: The Boeing Company; dated Jul. 19, 2007 (13 pages).

\* cited by examiner

SURVEILLANCE NETWORK SYSTEM

CROSS-REFERENCE TO RELATED APPLICATION

This is a divisional application of U.S. patent application Ser. No. 11/317,634, filed Dec. 22, 2005, entitled "SURVEILLANCE NETWORK SYSTEM," which is herein incorporated by reference in its entirety.

TECHNICAL FIELD

The present invention relates generally to surveillance using networks, such as in a military, scientific, civic, or commercial context.

BACKGROUND

Many commercial, civic, scientific, and military operations have the need to remotely conduct surveillance of an environment. For example, military groups may have a need to conduct surveillance on a battlefield or in an urban area. Scientists may need to conduct surveillance of a forest or wetland area. Likewise, examples of surveillance activities in a commercial setting include warehouse surveillance, surveillance of large retail establishments, etc.

Currently, surveillance systems may use one or more deployed sensor devices that are capable of passing on collected information to users and/or user devices. For example, users may be able to go into the field and collect such information directly from field devices. More advanced surveillance systems may use some form of remote connection to automatically send collected information back to a data collection system (or the like), so that the collected information can be analyzed, stored and tracked over time, etc. However, these current systems have limitations, including those related to limited energy supply for field devices, sensor deployment and placement issues, remote information storage and retrieval issues, satellite issues, network bandwidth issues, disruption issues, obstruction issues, etc. In addition, with respect to large surveillance systems (e.g., those having many sensors), information multiplication problems may exist, which may overload human users of the information. For example, current surveillance systems may produce only a small amount of relevant information and a relatively large amount of irrelevant information, which users must then filter through.

SUMMARY

The following summary is provided for the benefit of the reader only, and is not intended to limit in any way the invention as set forth by the claims. Aspects of a sensor network system for surveillance of an environment are described herein. Embodiments of the sensor network system may be used in commercial operations, civic operations, scientific operations, military operations, etc. Once deployed (e.g., via an aerial and/or terrestrial deployment strategy), the sensor network system may operate intelligently using an autonomous framework. For example, each node in the network system may operate as an individual device with its own job and purpose. For some designated network nodes (e.g., "full function devices"), this job/purpose may require that the network node act intelligently. In such cases, the network node is equipped with some level of processing/decision-making capabilities. Examples of such capabilities include image processing capabilities, decision fusing capabilities, etc. For other network nodes, this job/purpose may require little, if any, processing capabilities. In such cases, the network node is configured only for simple and/or limited-purpose operation (e.g., configured for sensing and performing basic RF communications). In either case, communication with other nodes in the network allows each node to play an autonomous yet active role in the sensor network system. Accordingly, the sensor network system can efficiently react to an array of conditions, fuse relevant data in an intelligent way, and, to varying extents, self-organize and self-manage.

In an illustrative example, a group of sensors that form part of the sensor network system is deployed on a bridge to monitor traffic for enemy presence in a military context. This group of sensors includes various primary sensors that, in this case, are sensitive to vibrations, as well as secondary sensors that, in this case, are image sensors (which include some basic image processing capabilities) and acoustical sensors (which include some basic sound processing capabilities). Some of the secondary sensors in the sensor network system include information fusing capabilities. That is, these sensors have the ability to aggregate information collected by different sensors/nodes to produce more useful information.

To conserve energy used by the sensor network system, all the sensors in the bridge example are configured to remain in a "sleep mode" with the exception of the primary vibration sensors. If there is activity on the bridge, the vibration sensors will detect it and initiate a process that "wakes" the secondary image sensors and acoustical sensors, which in turn, gather any necessary information. Because some of the image/acoustical sensors in this example are "smart" devices, they can tell whether the traffic on the bridge may be something that human users of the network are interested in. If so, they can activate additional sensors/devices. For example, by employing time/space based local reasoning (e.g., using feature vectors tied to automated exploitation methods), sensors in the network system may be able to determine the best sensor viewpoints for event data. Using their data-fusing capabilities, select intelligent sensors fuse data together, including data received from other endpoints/sensors.

In the bridge example, the sensors and network nodes then transmit aspects of the collected information to a network controller (e.g., through a set of one or more network routers). The network controller then passes the information on to the appropriate system/external network for user consumption and/or additional processing. In this context, the network controller can act as a primary host for application services that allow interchange between nodes of the sensor network and entities within one or more external networks/systems. In some embodiments, interactions between the network controllers and the one or more external networks/systems may be based on, for example, a publisher/subscriber model. This configuration reduces the amount of information that human users filter through, conserves energy expenditures at the network nodes (because nodes that are not currently needed can sleep) and allows network resources to be used in an efficient way.

DETAILED DESCRIPTION

Certain specific details are set forth in the following description and in FIGS. 1-5 to provide a thorough understanding of various embodiments of the invention. Well-known structures, systems and methods often associated with network environments have not been shown or described in detail to avoid unnecessarily obscuring the description of the various embodiments of the invention. Those of ordinary skill in the relevant art will understand that additional embodiments of the present invention may be practiced without several of the details described below.

Many embodiments of the invention described below may take the form of computer-executable instructions, including routines executed by programmable network nodes and computers. Those skilled in the relevant art will appreciate that the invention can be practiced with other computer system and network configurations as well. Aspects of embodiments of the invention can be embodied in a special-purpose computer or data processor that is specifically programmed, configured, or constructed to perform one or more of the computer-executable instructions described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers and the like).

Aspects of embodiments of the invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

Figure 1:
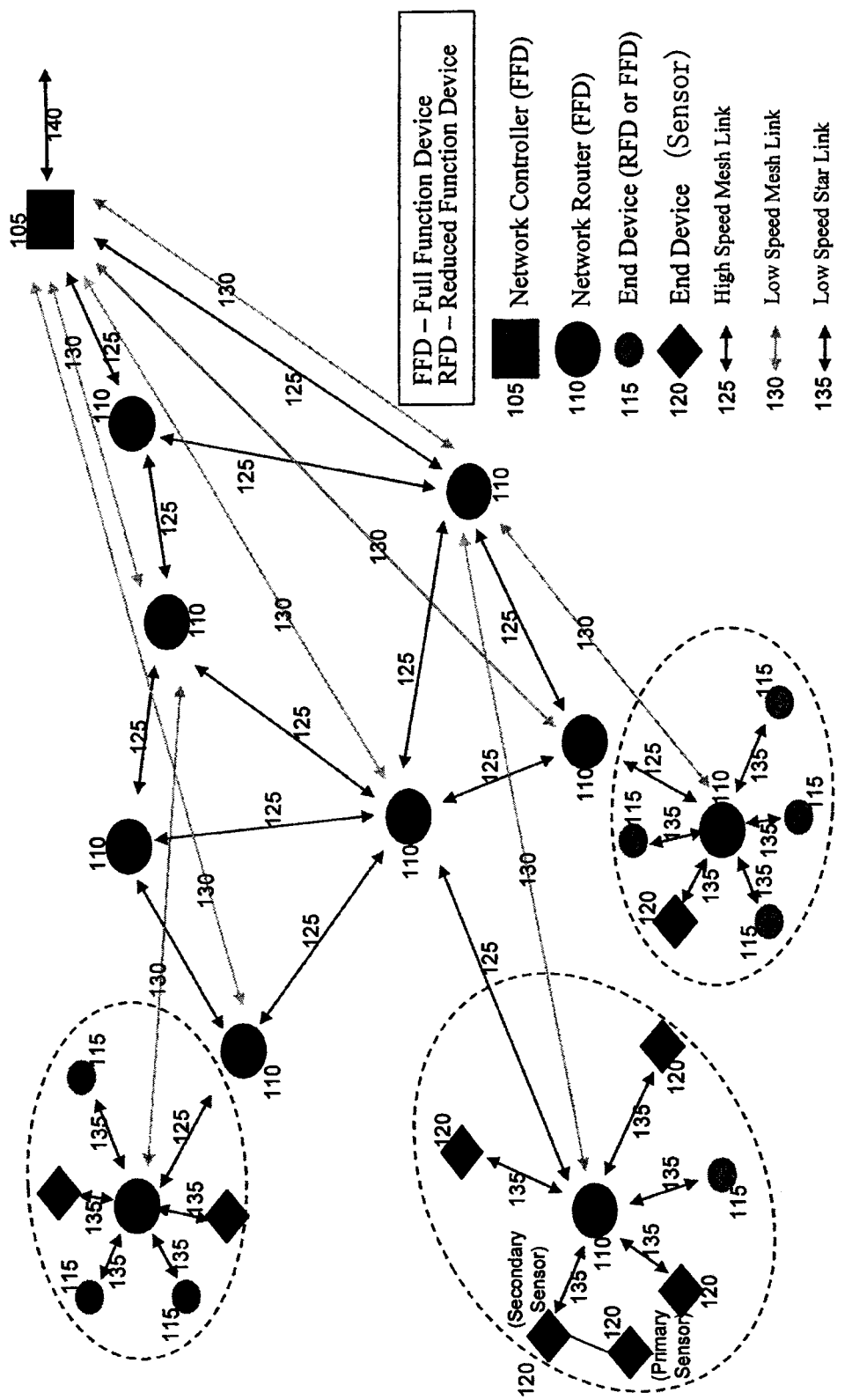
FIG. 1 is a system diagram showing an example of a configuration of a sensor network system in an embodiment.

FIG. 1 shows an example of a configuration of a sensor network system 100 in an embodiment. The sensor network system 100 may provide various capabilities including self-configuration capabilities, self-healing capabilities, and intelligent cooperative sensing. Other capabilities of the sensor network system 100 may include data storage and retrieval functionality, autonomous decision making capabilities, store and forward capabilities, and resource-aware sensing capabilities.

The sensor network system 100 may include at least three classes of devices, including full function devices, reduced function devices, and non-intelligent end devices. More specifically, the full functional and reduced function devices of the sensor network system 100 may include network controllers 105 (full-function devices), network routers 110 (full or reduced function devices), and network-capable end devices 115 (full or reduced function devices) including smart sensors (e.g., sensors with image processing capabilities), each having some level of network capabilities and some possibly functioning as gateways with respect to other network nodes. In some embodiments, the full function devices 105 are knowledgeable about the sensor network topology and are aware of alternate multi-path routes to reach the network controller. The non-intelligent end devices may include a variety of active and/or passive sensors 120. Examples of types of sensors may include audio/acoustic sensors, imaging sensors, video sensors, infrared sensors, RF sensors, vibration/seismic sensors, magnetic sensors, chemical sensors, etc. For example, in some embodiments, at least some of the sensors may be low energy and self-contained and provide basic sensor functionality, data dissemination and/or command/control execution. Because they may lack their own network capabilities, for such active and or passive sensors/devices 120 to function as part of the network, they may be used in conjunction with network capable end devices 115.

As needed, the sensors may be small (e.g., to prevent detection or remain unobtrusive) and/or come with a casing/shield that protects them against harsh environmental conditions. In some embodiments, the sensor devices may be self-powered (e.g., contain long-life batteries, operate on heat or solar energy, etc.) and consume low amounts of energy (e.g., by being energy efficient and having stand-by or inactive modes). For example, in some embodiments, image sensors may employ power-aware image compression and storage and power adaptation methods that are tailored to extended low level computation within the sensor.

The network connection components of the sensor network system 100 may include both high speed links 125 and low speed links (130 and 135). For example, as shown in FIG. 1, using multiple low speed star links 135, groups of one or more sensors and/or end devices may be linked to a network router 110 in a "star" configuration. In turn, the respective network router 110 (which provides both data routing and network management functionalities) may be linked to one or more other network routers 110 (e.g. using either high speed mesh links 125 or low speed mesh links 130), forming a mesh of network routers 110 that are, in-turn, linked to one or more network controllers 105.

Various types of wireless technologies may be used to implement wireless aspects of the sensor network system. For example, aspects of some embodiments of the sensor network system may include use of wireless personal area network (WPAN) technology and/or wireless local area network (WLAN) technology. Various IEEE standards may be used to implement such wireless network technology, including standards from the IEEE 802.15 family (e.g., 802.15.1, 802.15.2, 802.15.3, 802.15.3a, 802.15.4, etc.) for WPAN and standards from the IEEE 802.11 family (e.g., 802.11a, 802.11b, 802.11g, etc.) for WLAN. In general, however, almost any type of data link mechanism may be used including satellite, Bluetooth, and/or infrared/optical techniques, cellular or digital wireless communications, wired or wireless local area network, use of existing network infrastructure, etc., and any combination of such data link mechanisms. Where possible, intermittent data link mechanisms, such as bundled custodial-based network communications, may also be used to conserve resources, including bandwidth.

Figure 2:
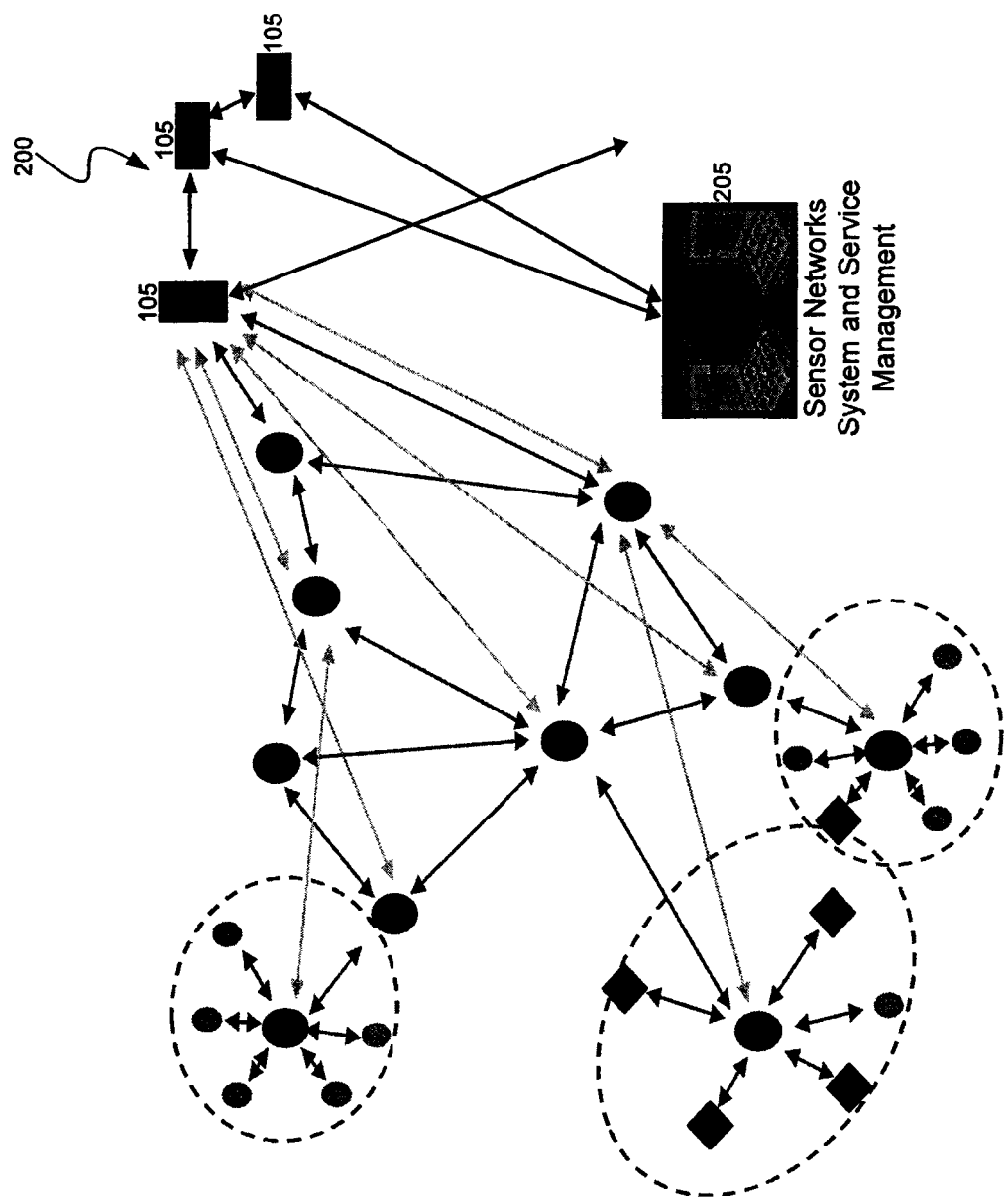
FIG. 2 is a system diagram showing an example of one or more network controllers forming a hierarchical network controller system in an embodiment.

As shown in FIG. 2, in some embodiments, one or more network controllers 105 may form a hierarchical network controller system 200 that manages overall sensor network configuration and operations, performs gateway/proxy functions, and provides access to external networks. In general, each network controller 105 in the network controller system 200 may be configured to accept, remove, and configure devices in the network (e.g., assign addresses and provide routing tables to enable efficient and effective communication of network nodes). The network controllers may also support both dynamic and periodic network synchronization, as well as support peer-to-peer communication among network nodes. In addition, the network controllers 105 may issue command and control information to end sensors (described in more detail with respect to FIG. 5) and receive data from sensors so that such data may be forwarded to external networks. Thus, the network controllers 105 may serve as the primary interface between the external networks and the end device sensors.

The network controllers may also support both dynamic and periodic network synchronization and support. For example, network controllers 105 may configure router nodes to perform repeater function to extend the range of the sensor network and perform "frequency management" including implementing spatial reuse plans for the sensor network. To enable the above functionality, the network controllers 105 may each maintain location and operational state information for devices/nodes within the sensor network.

In some embodiments, the one or more network controllers may be linked to a management subsystem 205 that provides both system management to the sensor networks and information management services to external networks. System management may include planning, deployment, monitoring, and network management. Information management services may include storage, discovery, data transformation, messaging, security, and enterprise service management.

I. Combining High Data Rate and Low Data Network Features

Due to the variability in the communication ranges and the amount/type of data to be interchanged, the sensor network system (which may consist of many nodes dispersed over a potentially wide geographical area) may employ a combination approach for data interchange consisting of low data rate links capable of information transfer over longer ranges and high data rate links capable of large information transfers over relatively shorter ranges. This type of approach solves problems associated with power consumption and resource conservation in a sensor network system having diverse energy consumption needs (which may be limited and/or fixed) and complex and dynamic communication needs.

As described above with respect to FIGS. 1 and 2 the computing and communication resources of each sensor node within the sensor network system can vary, (i.e., some sensor nodes have greater computing and communication capabilities than others). While it is true that sensor network systems may function in an ad hoc manner, in some embodiments, communication to and from a particular sensor node is more akin to a client-server interaction. For example, each sensor node may interface with another network node (e.g., a network controller 105 or network router 110 of FIG. 1) that functions as a gateway, dynamically establishing a communication link between the nodes that allows for information within the network to be gathered and directed for remote processing in an environment where computing and communication resources are less constrained. This implies that the sensor network system can be envisioned as a hierarchical tree structure, such as directional acyclic graph (DAG), with the root node of the hierarchical tree being the gateway node and sensor nodes forming various tiers of child/leaf nodes, as roughly depicted in FIG. 1.

In some embodiments, this hierarchical tree data model/framework results in sensor nodes closer to the gateway node performing more in-transit forwarding between its higher and lower tier level sensor nodes. To conserve computing and communication resources (thereby conserving power and extending sensor node life), it is sometimes desirable to minimize the number of hops taken by the data flow from the child/leaf sensor nodes to the gateway node. In some sensor network systems, this type of conservation is especially desirable for intermediate in-transit forwarding nodes. Accordingly, in some embodiments the sensor network is configured so that at least some of the child/leaf sensor nodes are each able to communicate directly with the gateway node via low data rate links. In contrast, data-intensive information interchanges between a given child/leaf sensor node and a gateway node may involve multiple intermediary in-transit hops using high data rate links, which have shorter ranges. In some embodiments, this combination approach facilitates implementation of a link power budget and/or frequency/spectrum reuse plan.

The communication requirements of the sensor network system may differ based on varying levels of network capacity and power needs, as well as mission requirements. For example, many sensor network nodes are sensitive to power consumption, with less capable nodes most likely using less bandwidth and more capable nodes using more bandwidth, since bandwidth is proportional to power consumption (the communication component is typically the highest power drain of any sensor node element). In addition to power consumption, generally, more capable nodes have more data to transmit, are larger, and likely have more capacity for power storage. Less capable nodes are likely to be smaller and need less network bandwidth.

Figure 3:
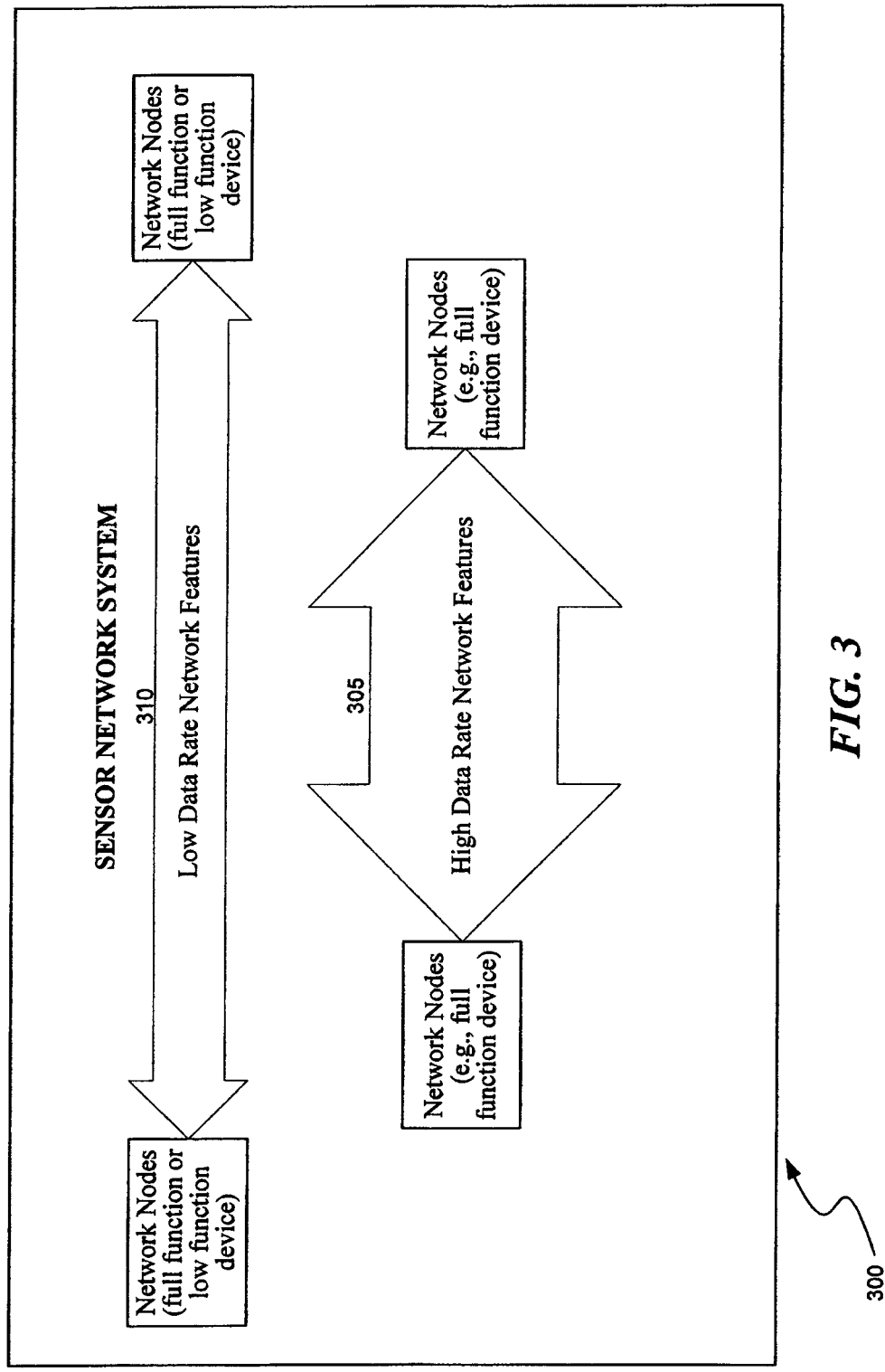
FIG. 3 is a block diagram showing an embodiment of a sensor network system with features of both a high data rate network and a low data rate network.

As shown in FIG. 3, a sensor network system 300 in accordance with some embodiments may combine features of a high data rate network 305 with features of a low data rate network 310. To conserve energy, the sensor network system 300 illustrated in FIG. 3 utilizes low data rate communications for the dissemination of, for example, command and control-type information (used in sensor and network management) and the transfer of information among sensor nodes having simple primary transducers and uses high data rate communications for sensor nodes experiencing larger information and data streaming interchanges. For each node, the determination of whether to employ either the high data rate 305 or the low data rate network features 310 may be based on a number of factors such as, capability of the node, capabilities of the surrounding nodes, criticality and latency constraints of the data, amount of data to be transferred, physical and logical state of the sensor nodes involved in the interchange, energy use requirements/limits, geographical location, frequency/spectrum reuse plans, etc. This determination may be variable (e.g., it may change from mission to mission, as new resources become available, or even transaction by transaction, as some nodes are configured to use both types of network features).

For example, the high data rate network features 305 may provide high bandwidth, short-range connectivity for transferring data-dense information within the network 300 (e.g., by supporting applications that allow for on-demand imaging and video capture and transmission to computing devices performing information and decision support processing). To further illustrate, information from array sensor nodes, such as image capture sensors, benefit from the movement of larger amounts of data with stringent latency controls favoring high data rate/bandwidth transfer. In addition, data movement for the array sensor nodes is likely bursty in nature, event driven, thus favoring high data rate network features, and involves high power requirements. An example of a high data transfer rate may be in the range of gigabits/second or higher (or high megabits), while an example of a low data transfer rate may be in the range of megabits/second or lower.

In contrast, the low data rate network features 310 may provide lower bandwidth, long range connectivity for transferring less dense information within the network (e.g., allowing information transfer from sensors to computing devices performing information and decision support processing) and may be used to monitor and control aspects of both the high data rate network features and the low data rate network features. For example, in some embodiments, the dissemination of command and control type information is ubiquitous across the network and occurs more or less continuously. Command and control type messaging typically involves small messages (which use less bandwidth). Similarly, messages from sensor nodes supporting simple primary transducers, such as vibration and acoustic signatures, tend to be small and have low bandwidth requirements. For example, a discrete sensor detects an event, wakes up from its sleep state, gathers data for a predetermined period and prepares to send the gathered data to an upper layer fusion node. Since this is a low level sensor with minimal capability and is designed to maximize its lifetime through minimum power consumption, it is configured to send data at a minimal data rate. In general, discrete sensor data movement across the network is typically bursty in nature and the messages are likely small to medium in size, which again is facilitated by the use of low to medium bandwidth. Latency may be tightly specified, thus impacting capacity (bandwidth) requirements.

In some cases, particular sensor nodes (e.g., those with intermediate or high capabilities) may be configured for communication using both high data rate network features and low data rate network features. For example, a sleeping video sensor is triggered into operation via a command from the fusion node in response to the data received from a discrete sensor (via a low data rate network features). In response, the video sensor begins operation and in-turn streaming real-time video over the network (via high data rate features). Along similar lines, more capable sensor nodes may perform data aggregation and computation functions on behalf of the less capable sensor nodes. As a result, more capable nodes can either work as an end device with high data rate mode or as an intermediary node to connect the less capable nodes to the controller. The intermediary nodes typically have both the high data rate and the low data rate. For this type of node, the decision on which data rate to use is made at the application level of the node that runs on the operating system of the sensor node.

Generally, routing for low data rate network features 310 may be based on hierarchical routing protocols with table-driven optimizations, while routing for high data rate network features 305 may be based on table-driven routing from source to network controller. This type of configuration may permit multiple paths between a given device and network controller for both low and high data rate networks.

The following text describes the low data rate network features 310 and the high data rate network features 305 in the context of a protocol stack (e.g., application layer, transport layer, network layer, link layer, physical layer, etc.). With respect to low data rate sensor network features 310, IEEE 802.15.4 may be used as a starting point for link and physical layer protocols. In some embodiments, access to communication channels may be implemented via carrier sense multiple access with collision avoidance (CSMA/CA). This allows devices accessing the communication channels to maintain low duty cycle, while at the same time supporting a large number of devices. When operating under such circumstances, a network controller may use low data rate network features 310 to transmit reference signals to various network nodes/devices, thereby announcing its presence and making the network controller detectable to such network nodes/devices. Some embodiments may also employ a time division multiple access (TDMA) beacon structure for implementing low data rate network features, which is useful in cases where dedicated bandwidth and low latency is desirable. For example, while operating in a beacon mode, a network controller may transmit beacons at periodic intervals defining a super-frame structure and timing reference.

With respect to high data rate sensor network features 305, IEEE 802.11 may be used as a starting point for link and physical layer protocols. In some embodiments, access to communication channels may be implemented using a TDMA virtual beacon structure. Aspects of the low data rate network features 310 may be used to define the super-frame and timing reference for the high data rate network TDMA structure. The sensor network high data rate network features 305 may also employ a CSMA/CA mechanism as a backup (e.g., when connectivity via low data rate network system is disrupted).

Because of complexities associated with high data rate transmission (e.g., complexities relating to enhanced storage requirements, power requirements, computing requirements, and communication requirements), the high data rate network features 305 may be limited to interactions among full function devices. Scheduling of network access by such devices may be performed in coordination with a network controller, which allows for information transfer from non-intelligent sensors to reduced functional and/or full function devices performing information and decision support processing. Using the low data rate network features 310, each device may request time references from the network controller to maintain dynamic synchronization is maintained by requesting timing reference from the network controller via the out-of-band low data rate network features prior to the scheduled communication. Accordingly, both endpoint devices (e.g., sensors) and intermediary communication devices (routers and other network nodes) may be aware of the route to reach the network controller, which manages the dissemination of the routes.

II. Monitoring Network Nodes Based on State (Node Profiling)

In some embodiments, the sensor network system may be configured as a "smart network" that provides appropriate agile connectivity and bandwidth through awareness of network nodes, including monitoring their health, states, and conditions. In such a smart network, network controllers, or the like, can be used to monitor the health and/or state of network nodes within the network over time. One of the problems this solves is related to the fact that sensor nodes within the sensor network that are not tethered have finite life due to various conditions such as power storage capacity, adverse environmental conditions, or being disabled by external entities such as the enemy. In addition, the sensor nodes may be tampered with by external entities to signal erroneous information as a means of denial of service (DoS) attack. For these reasons and others, it is beneficial that backend sensor network management components (such as the management subsystem 205 of FIG. 2), or the like, monitor the health status of the sensor nodes to determine the affectivity of each sensor node to determine whether such sensor nodes are capable of performing at or above threshold performance levels.

Monitoring the health and/or status of network nodes also enables the management subsystem to determine the validity of the information received from the particular node. For example, the management subsystem may perform authentication (directly and/or indirectly) to verify a node's identity and, thereby, validate the information received from the particular node. In some cases, a sensor node may be factory programmed with a unique serial number. Prior to deployment, such sensor nodes may also be programmed in the field with unique pre-placed security keys that further facilitate authentication. The management subsystem may then authenticate the sensor node based on its serial number and security keys using challenge/response mechanisms. One advantage of this type of authentication scheme includes eliminating the need to perform authentication based on Public Key Infrastructure (PKI), which ordinarily requires nodes to have more advanced computing and communication capabilities.

Another way that the sensor network system can facilitate authentication is through the use of alternate mechanisms, such as challenge/response and RF emission signature comparison. For example, prior research has shown that each wireless transmitter has a unique RF emission signature. Thus, in some embodiments, the RF emission signature of a given sensor node can be compared against the RF emission signature profile stored in the management subsystem to verify its identify.

Once the physical identity of a given sensor node has been established, its health status and performance are monitored and profiled by the management subsystem. For example, state conditions that can be monitored include RF signal strength, power consumption, power state, response time, latency, thermal condition, etc. In this way, inconsistencies in the state of a network node (e.g., the occurrence of non-linear changes in the network node's behavior) can signal action by the network. Such action may include terminating the problematic node's participation in the network (e.g., in the case of a node that is not capable of operating correctly or has otherwise been compromised); restricting the node's participation in the network; conducting further diagnostics on the node; reconfiguring the node (e.g., by facilitating a software update); generating a work order for repair of the node, deploying a new replacement node or set of replacement nodes, etc. The monitoring or profiling of network node may be implemented using one or more techniques including advertising/broadcasting by nodes (ranging from dumb devices to reduced function and full function devices) and/or querying by network controllers. Similar techniques may be used for accepting newly deployed nodes into the network.

The sensor network system may have multiple sensor nodes collecting data about similar/related environmental parameters. This implies that data gathered from a particular sensor node will very likely be consistent with other sensor nodes within its proximity. In this context, nodes within the same vicinity may be those located within a specified threshold distance and/or those positioned geographically in such a way that they can (theoretically) measure the same factor in the environment and provide results within a tolerance range where the mission plan defines the tolerance range. Accordingly, the management subsystem may analyze data received from various sensor nodes and establish the inter-relationships between the data gathered from peer sensor nodes within the same geographical region. For example, if there are temperature sensor nodes within close proximity, then the management system may assume that the temperature measurements received from each of these sensor nodes should, theoretically, be within a specified range. Measurements from sensor nodes that are beyond the expected range may then be consider suspect by the management subsystem. Once data is received from a particular sensor node is deemed questionable, the management subsystem can attempt to re-authenticate the sensor and query it for its performance state information. If the management subsystem determines that the integrity of the data from a given sensor node cannot be established, it can appropriately account for it by ignoring data received from the problematic node possibly disabling it. In addition, measurements that fall outside a specified tolerance range may be rejected.

The management subsystem may expect data received from a given sensor node within a given temporal period to be within certain bounds based on the dynamics of one or more sensed parameters. For example, multiple data samples from a vibration sensor node within a short period can be expected to follow an estimated trajectory without sudden large deviation. The management subsystem may profile the data received from the given sensor node to ensure that the node is functioning appropriately. Should the received data not meet the specifications, the management subsystem may perform re-authentication and diagnostics and, if need be, ignore data received from and possibly disable the particular sensor node if it does not meet the desired performance profile.

III. Node Deployment, Self-Configuration, Self-Organization, and Self-Healing

In some embodiments, the sensor network system may be configured for self-deployment, self-configuration, self-organization, and/or self-healing. This allows for the network to be initialized and successfully maintained across wide (and sometimes difficult to access) geographic areas with little or no manual intervention for multiple missions. For example, in many cases, it is simply not viable to expect manual configuration of the sensor network in the field, especially in hostile environments. After nodes are physically deployed, the sensor network incorporates various self-organization, self-configuration, and self-healing techniques that allow network nodes to be effectively configured, organized, and managed within the sensor network system on an ongoing basis, while eliminating or minimizing the need for human intervention in this regard.

Figure 4:
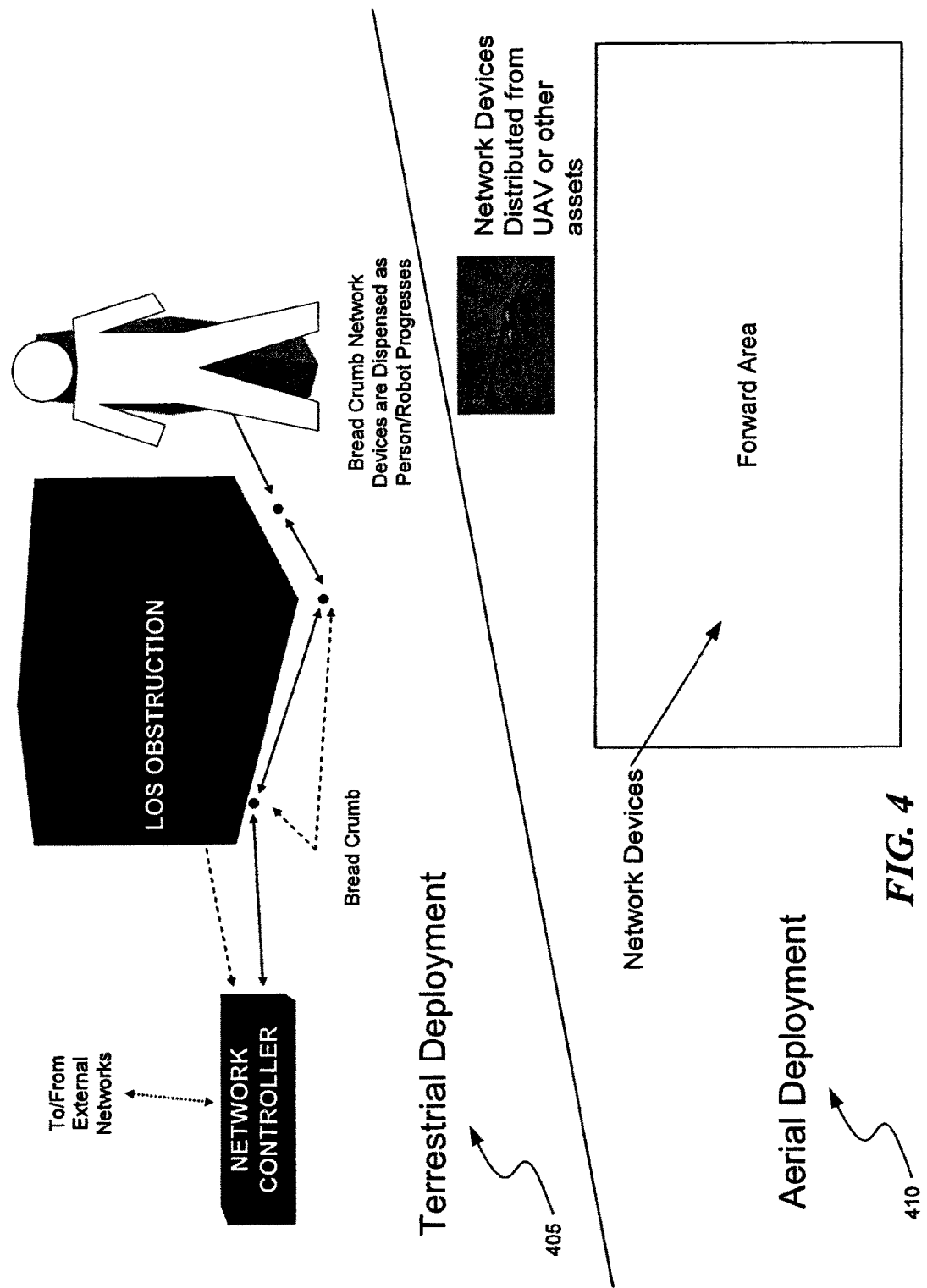
FIG. 4 is a diagram showing examples of deploying a sensor network system in some embodiments.

As shown in FIG. 4, in some embodiments, deployment of nodes comprising the sensor network system may involve various terrestrial and/or aerial deployment strategies, e.g., so that wireless sensor nodes can be seeded in the field, potentially across wide geographical areas. Deployment may involve dispersal of sensor network devices by persons, robots, unmanned air vehicles (UAVs), ground platforms, etc. For example, in a military/combat environment, troops or robots may deploy network nodes on the ground using a breadcrumb approach, where devices are dispensed as needed on a path as a person or robot progresses in a surveillance network. To avoid problems with obstructions that may block network communication, sensors may be placed at locations so that every sensor/network node is in communication with at least one other network node. Aerial deployment (e.g., by UAV) (also illustrated in FIG. 4) is also a possibility in high risk areas, or areas that are difficult to reach from the ground (e.g., active battle zones or wilderness areas). However, aerial deployment may result in rougher placement of sensors.

A number of prior publications assume that sensor networks operate as ad hoc networks with a high degree of peer-to-peer communication. While it is true that sensor networks function in an ad hoc manner, communication to and from a particular sensor node is often more akin to a client-server interaction. For example, in some embodiments, each of the sensor nodes within the sensor network system interfaces with a gateway node (e.g., a full functional device or a network controller) that allows for information to be gathered and directed for processing at a remote location (e.g., a location where computing and communication resources are not constrained), resulting in a gateway to sensor and sensor to gateway communication model. As described in preceding sections herein, this implies that the sensor network system can be envisioned as a hierarchical tree structure, such as directional acyclic graph (DAG), with the root node of the hierarchical tree being the gateway node and sensor nodes forming various tiers of child/leaf nodes. In some embodiments, the gateway node is expected to periodically transmit beacon frames for deployed sensor nodes to synchronize with. This is not an issue for the gateway node since it does not have the power, computing, and communication resource constraints experienced by sensor nodes.

One challenge involved in maintaining an effective sensor network that is self-configuring, self-organizing, and self-healing relates to the automatic discovery of the sensor nodes and establishment of the DAG that effectively connects the sensor network to the gateway node, which may be driven by particular mission objectives, and may thus, change over time. In other words, as part of the seeding process, each sensor node determines where it stands relative to other nodes (e.g., within the hierarchical tree structure described above). Accordingly, while the seeding of the sensor nodes across a geographical area may be random from a micro level, (i.e., not based on a specific or relative location), distribution of sensor nodes at macro level is organized based on the mission objectives.

Once the sensor nodes have been deployed, the more capable sensor nodes establish direct or indirect connectivity with the gateway node for authentication and subsequently to receive command and control information from the gateway node. For example, soon after physical deployment, existing sensor nodes are configured to detect newly deployed nodes and incorporate them into the network in an organized and meaningful way. In one illustrative example, a new set of sensor nodes are physically deployed within the network. Upon deployment, these nodes each broadcast a signal to surrounding nodes in their vicinity (assuming the sensors were deployed in the proper area and such nodes actually exist). In some embodiments, more capable sensor nodes that have already been configured periodically transit beacon frames to enable recently deployed less capable sensor nodes to synchronize and associate with the given more capable sensor node. The more capable sensor nodes also update the gateway node with information and state of the less capable sensor nodes that have been associated with it. The gateway nodes compiles this overall information of the sensor network state to compute the desired topology and routing hierarchy to be used by the sensor network system at each phase of the mission. The computed routing, primary, and alternate, information for each of the more capable sensor nodes is sent to the respective sensor nodes by the gateway node, thereby enabling self-configuring operation of the sensor network.

Even if there are no network controllers operating in the immediate vicinity of the newly deployed sensors (i.e., within range of receiving such broadcasted signals), by employing multi-hop techniques (the passing on of information from one node to another to reach an intended destination) an indication of the broadcasted signals eventually reach a network controller capable of managing the self-organization and self-configuration of the network relative to these newly deployed nodes. In particular, the network controller may be programmed to send out information via lower level gateway nodes to each node that is to be affected by these newly deployed nodes. This information may specify the role/operation of the newly deployed nodes and provide rules of interaction between the new nodes and existing nodes. In addition, the network controller may be programmed to send out self-configuration information for the newly deployed nodes, so that they may each be made aware of their specific operation/role within the network. This specific operation/role may be based not only on the capabilities of the deployed nodes, but also on the actual location in which it is deployed. Thus, in some cases where physical deployment at a precise location is difficult to achieve (e.g., with aerial deployment), the ultimate role and or operation of a newly deployed node cannot be verified in advance and is not determined until it has come to rest at its location and its actual location coordinates can be determined.

In addition to self-configuration and self-organization based on newly deployed nodes, the sensor network system may also perform self-configuration and self-organization when faced with instructions to perform a new task, activity, or mission. For example, given a new mission to monitor ground activity within an area defined by a set of coordinates, the network controller may send out new self-configuration/self-organization messages to an affected set of nodes within that area. Likewise, problems in the network, (e.g., defective or malfunctioning nodes) may also be handled using similar techniques. For example, if a particular network node is no longer functioning properly and its quality of performance falls below a given level (detected, for example, using the self-monitoring techniques described above), the network controller is programmed to send out instructions to affected nodes so that they can self-reconfigure to eliminate that node from the network.

In general, self-configuration, self-organization, and self-healing is performed via the communication of key information within the network, sample techniques for which are described below with respect to FIGS. 5 and 6.

Figure 5:
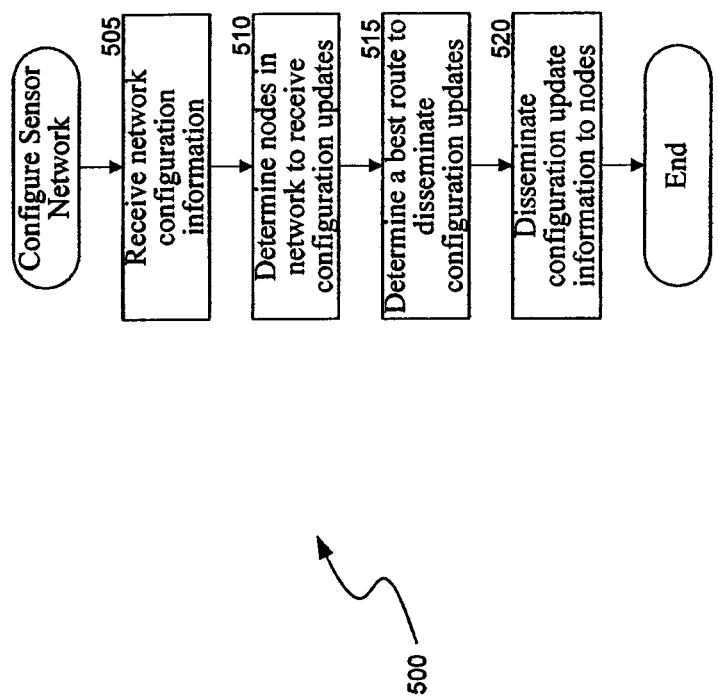
FIG. 5 is a flow diagram showing an example of a routine for disseminating information to nodes in a sensor network in an embodiment.

FIG. 5 provides an example of a routine 500 for disseminating information to nodes in a sensor network in a particular embodiment. For example, users of the sensor network may want to disseminate information to full and/or reduced functional nodes of the network in order to configure the network in accordance with new performance requirements (e.g., as specified in a mission plan). This also facilities the self-organizing and self-managing of the sensor network system.

The routine 500 of FIG. 5 is described from the perspective of a gateway node such as a network controller node. At block 505, the network controller receives network configuration information from a source (e.g., such as would be associated with a new mission plan), such as the management subsystem 205 of FIG. 2, or some other user-controlled source (including sources from an external network) that has access to the network controller. At block 510, the network controller determines which nodes in the sensor network are to receive updated information based on the received network configuration information. At block 515, the network controller determines a best route for disseminating information to each of the nodes that are to receive updated information. In some embodiments, network routing may be handled using Internet protocol (IP) with respect to namespace and packet framing for low and high data rate network features. To improve effectiveness, network routing within the sensor network system may involve the network controller defining and then selecting from multiple paths between itself and a given network node. At block 520, once the network controller determines the appropriate route, the information is disseminated to the relevant network nodes, thereby allowing the sensor network to implement the desired configuration updates. The routine 500 then ends.

Figure 6:
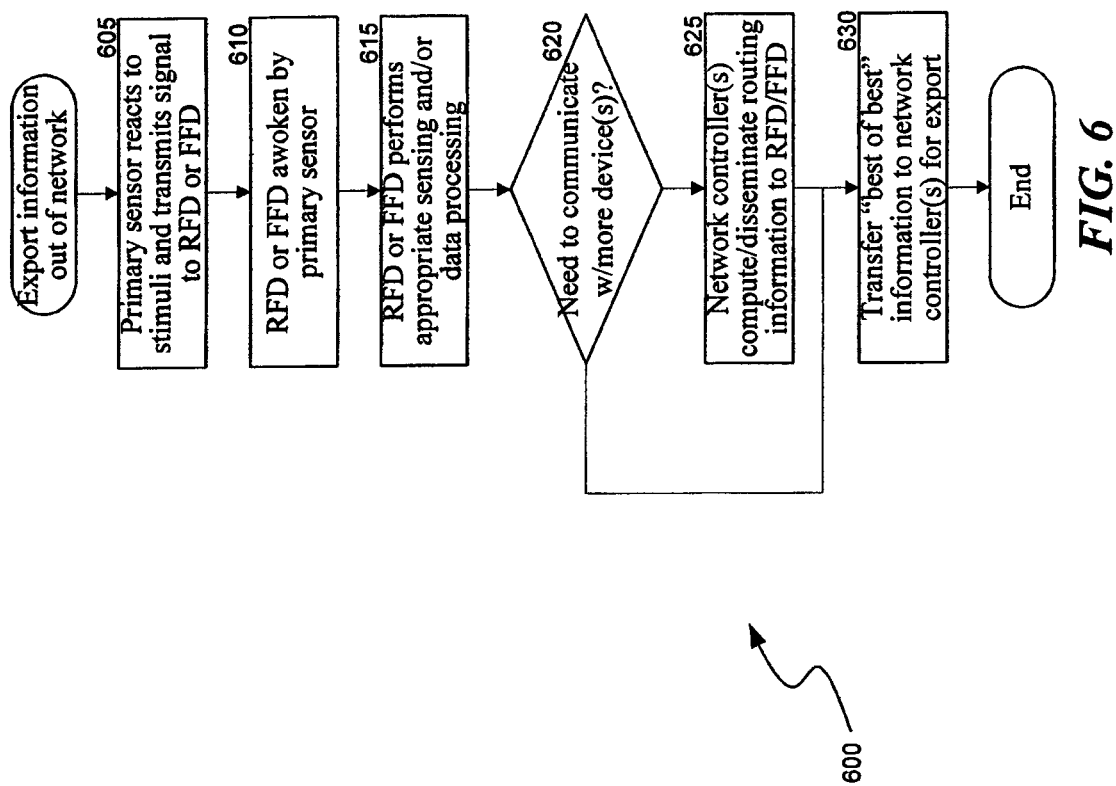
FIG. 6 is a flow diagram showing an example of a routine for exporting information from nodes in a sensor network.

FIG. 6 provides an example of a routine 600 for exporting information from nodes in a sensor network. The routine 600 is performed by an embodiment of a sensor network system. The routine 600 begins at the individual device level and ends at the network controller level. At block 605 a non-intelligent end device in the network (e.g., a vibration sensor, an audio sensor, and RF sensor, etc.) reacts to stimulus in its environment by transmitting a signal (e.g., via Bluetooth, 802.11, infrared, RF, etc.) to a reduced function device (e.g., a sensor with image processing capabilities, acoustic processing capabilities, etc.) in the network. At block 610, the reduced or full function device (which may be in the proximity of the non-intelligent end device) may wake from a "sleeping" or power-safe mode in response to receipt of the transmitted signal. At block 615, the awakened, reduced, or full function device performs appropriate sensing/data collection and processing, as it is programmed to do. This may include decision making with respect to how the device collects information, and what the device, in turn, does with the collected information.

For example, the reduced or full function device may collect image information, perform initial processing of that image information and determine that additional surveillance is needed. Based on this, the reduced or full function device may awaken other devices/nodes in the network to perform additional tasks. In another example, the reduced or full function device may determine that collected information should be transmitted to another network node, so that the information may be fused with other information that is being collected by nodes in the network. More specifically, smart storage using information fusion of sensor data allows the sensor network to provide only "best of best" information for later communication back to users. It may also provide for graceful loss of event information if in-network storage capacities are exceeded. In yet another example, the reduced or full function device may determine that the collected information should be transmitted to a network controller for exportation outside the network.

At decision block 620, if there is no need for the reduced or full function device to communicate with other nodes within the network, the routine skips forward to block 630. Otherwise, the routine continues at block 625, where one or more network controllers may compute and disseminate the routing optimization information (e.g., as a result of request from one or more network nodes). For example, in connection with low data rate network features, the network controller may use hierarchical routing protocols with table-driven optimizations to determine a "best path" at any given time. Such routing optimizations may be implemented using several techniques, such as a cluster tree routing algorithm, an ad hoc on-demand distance vector (AODV) routing protocol, a landmark ad hoc routing (LANMAR) protocol, etc.

At block 630, select collected data intended for consumption for end users is transferred from one or more network nodes (including high function devices, reduced function devices, and/or other devices) to one or more network controllers. Routing to nodes such as the network controller may be performed using high data rate network features and routing decisions may also be based on table-driven routing information, in which the network controller computes and disseminates routing table information to devices with which it communicates. Once at the network controllers, the information can be exported under an information exportation scheme. For example, this may include real-time updates and/or involve periodic uploads over a network connection. It is also possible to use over-flight data collection mechanisms where network type connections are not available. For example, power efficient store-and-forward communications combined with WLAN techniques allow not only for sensor/network coordination, but also for over-flight data retrieval. The routine 600 then ends.

Figure 7:
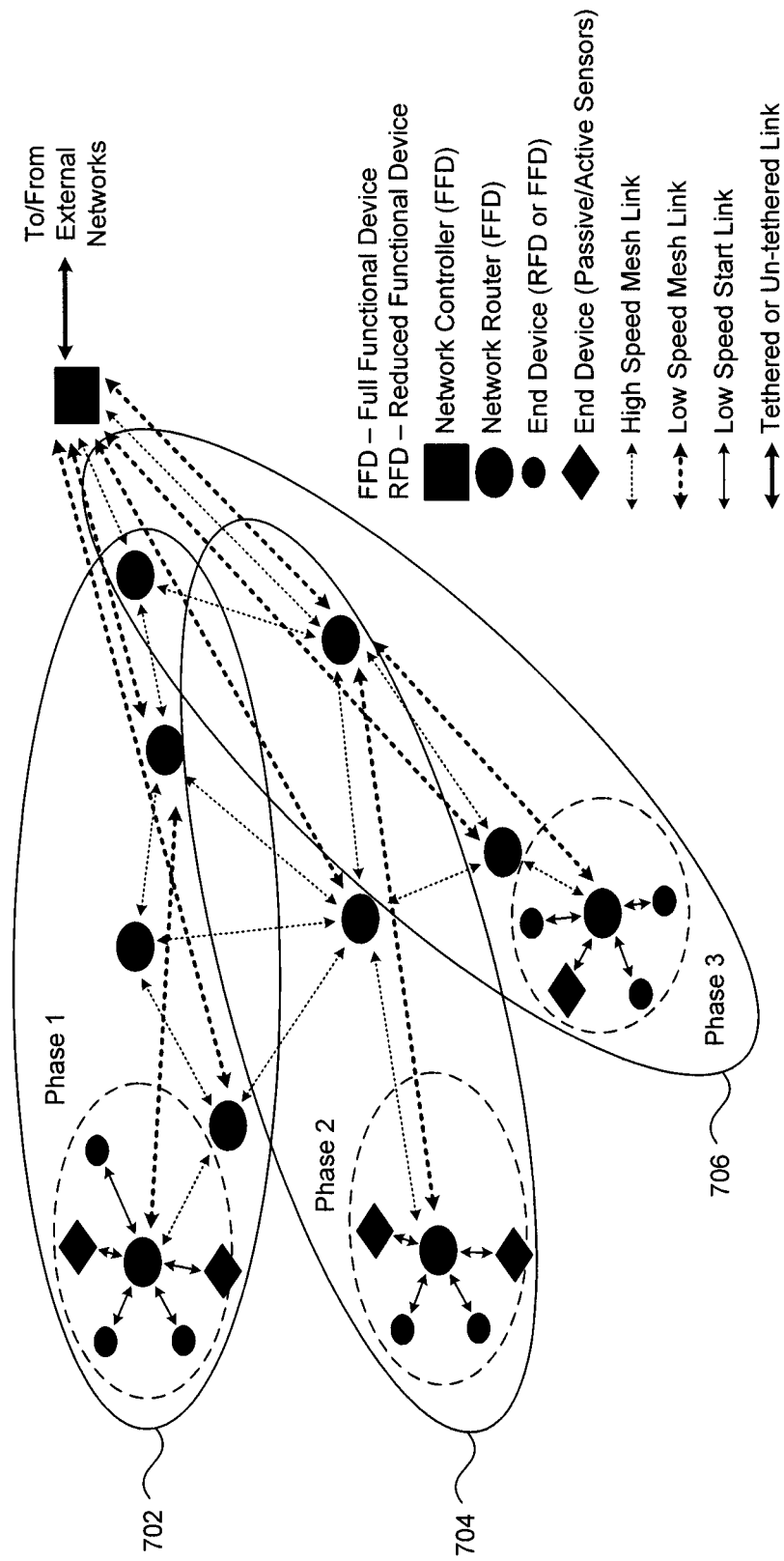
FIG. 7 is a system diagram showing an example of a sensor network configuration based on mission phases in an embodiment.

In some embodiments, a gateway node such as a network controller manages the operation of the sensor network (e.g., by dynamically creating new communication links between sensor nodes) based on the needs of the mission, which can change throughout the mission based on how the mission progresses. FIG. 7 is a system diagram showing an example of a mission phase-based configuration of a sensor network system in an embodiment. In particular, FIG. 7 illustrates the use of the sensor network across a mission having three phases (702, 704, and 706). In some cases, these mission phases may be determined as the mission progresses, based on real-life conditions (as opposed to being known in advance). As illustrated, not all the sensor nodes need to be active for the entire mission. Thus, sensor nodes are configured and organized in a manner that they best serve each mission phase. In some embodiments, the system places sensor nodes that are not utilized for a given mission into a deep sleep state to conserve power resources. As subsequent mission phases begin, the system awakens the appropriate sensor nodes for the particular mission phase into active state. The demarcation between sensor nodes used within different mission phases is not mutually exclusive (i.e., certain sensor nodes may be used across multiple mission phases).

In some embodiments, the gateway nodes performs management of the sensor nodes utilized for a given mission phase. Thus, during any given point during the mission, the sensor network is customized based on the needs of the particular mission phase. It is possible that during a given mission phase, some of the sensor nodes may become non-operational for various reasons, such as, power storage capacity, adverse environmental conditions, or being disabled by external entities such as the enemy. This may result in reach-back disruption between the active sensor nodes to the gateway node. Under such circumstances the gateway node analyzes the topology map, computes the new routing hierarchy, and commands the appropriate inactive sensor node(s) from deep sleep state into active state. Following this, the gateway node updates the appropriate active sensor nodes with the updated routing, primary and alternate, information thereby enabling self healing operation of the sensor network to fulfill the objectives of the current mission phase(s).

From the foregoing, it will be appreciated that specific embodiments of the invention have been described herein for purposes of illustration, but that various modifications may be made without deviating from the spirit and scope of the invention and aspects of the invention described in the context of particular embodiments may be combined or eliminated in other embodiments. For example, while certain embodiments describe the use of sensor networks operating in a military environment, the invention may be implemented in the context of other environments where a need for surveillance is established.

Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A surveillance network comprising:
a controller configured to:
for each of a plurality of sensors within the surveillance network,
select a sensor from among the plurality of sensors within the surveillance network, and
determine a best route to disseminate one or more configuration updates to the selected sensor within the surveillance network at least in part by:
defining multiple routes between the controller and the selected sensor within the surveillance network, and
selecting the best route from among the defined multiple routes between the controller and the selected sensor within the surveillance network to disseminate the one or more configuration updates to the selected sensor within the surveillance network;
the plurality of sensors being capable of communicating with the controller, each of the plurality of sensors being capable of collecting information from its environment and sending the collected information to the controller via a communication link between the controller and the sensor, wherein at least one of the plurality of sensors is configured for communication using both high data rate network features and low data rate network features, wherein routing for low data rate network features is based on hierarchical routing protocols with table-driven optimizations, and wherein routing for high data rate network features is based on table-driven routing from a source to the controller;
the controller being responsive to a communication from each of the plurality of sensors to:
authenticate a given sensor using a unique serial number programmed in the given sensor and further authenticate the given sensor based on an RF signature of the given sensor,
compare information collected from the given sensor to information collected from a set of sensors located in a vicinity of the given sensor, and
determine whether the collected information from the given sensor is substantially outside of a tolerance range of the information collected from the set of sensors located in the vicinity of the given sensor,
wherein the controller further disconnects the communication link between the controller and the given sensor in response to determining that the collected information from the given sensor is substantially outside of the tolerance range of the information collected from the set of sensors located in the vicinity of the sensor.

2. The surveillance network of claim 1 wherein the controller further accepts the collected information if the collected information is in a given tolerance range of the information collected from the set of sensors located in the vicinity of the given sensor and rejects the collected information if the collected information is outside of the given tolerance range of the information collected from the set of sensors located in the vicinity of the sensor.

3. The surveillance network of claim 1, wherein the controller is further responsive to communication from each of the plurality of sensors to generate a work order for repair or replacement of the given sensor if the collected information from the given sensor is outside of the tolerance range of the information collected from the set of sensors located in the vicinity of the given sensor.

4. The surveillance network of claim 1 wherein the set of sensors is from the plurality of sensors.

5. The surveillance network of claim 1 wherein the controller authenticates the given sensor based on its security key.

6. The surveillance network of claim 5, wherein the security key of at least one sensor is programmed in the field and not at the time of manufacture.

7. The surveillance network of claim 5, wherein the security key of at least one sensor is programmed at the at least one sensor's time of manufacture.

8. The surveillance network of claim 1 wherein the controller authenticates each sensor based on its RF signature and security key.

9. The surveillance network of claim 1, wherein the controller is further configured to:
receive a mission plan, wherein the mission plan includes the tolerance range and networking configuration information; and
in response to receiving the mission plan, configure the surveillance network based on the network configuration information of the received mission plan.

10. The surveillance network of claim 9 wherein the networking configuration information specifies which sensors in the surveillance network are to receive updated information.

11. The surveillance network of claim 9, wherein the received mission plan that includes the tolerance range further includes networking configuration information and wherein the controller is further configured to:
in response to receiving the mission plan, configure the surveillance network based on the network configuration information of the received mission plan.

12. The surveillance network of claim 1, wherein the at least one attribute of the at least one sensor comprises a capability of the at least one sensor and a geographical location of the at least one sensor.

13. The surveillance network of claim 1, wherein at least one of the plurality of sensors is configured to communicate using both high data rate network features and low data rate network features, and wherein the determination of whether to use high data rate network features or low data rate network features is based on capabilities of sensors surrounding the at least one sensor, criticality and latency constraints of data to be transferred, an amount of data to be transferred, a physical state of the at least one sensor, a logical state of the at least one sensor, and energy use limits.

14. The surveillance network of claim 1, wherein each high data rate exceeds 1 gigabit per second and wherein a determination of whether to use high data rate network features or low data rate network features can vary from transaction to transaction based on at least one attribute of the at least one sensor.

15. The surveillance network of claim 1, wherein the controller is further configured to disconnect a communication link between the controller and a first sensor of the plurality of sensors in response to determining that information collected from the first sensor is outside of a tolerance range of the information collected from the set of sensors located in a vicinity of the first sensor.

16. The surveillance network of claim 1, further comprising:
a management subsystem configured to store an RF emission signature profile for each of the plurality of sensors.

17. A method, for handling surveillance information, in a controller including a processor and an associated storage area, the method comprising:
collecting, by the controller, information from one or more network nodes within an environment, the collected information relating to a given factor or set of factors wherein at least one of the network nodes within the environment is configured to perform data aggregation functions for at least one of the other network nodes within the environment, wherein routing for at least one of the one or more network nodes within the environment is based on hierarchical routing protocols;
authenticating, by the controller, the one or more network nodes based on an RF signature of each of the one or more network nodes;
accepting, by the controller, the collected information if a variance range between the collected information and the information received from at least two other network nodes satisfies a specified threshold; and
rejecting, by the controller, the collected information if the variance range between the collected information and the information received from the at least two other network nodes does not satisfy the specified threshold.

18. The method of claim 17, wherein the one or more network nodes include multiple sensors operating in at least partial cooperation.

19. The method of claim 17, wherein the one or more network nodes includes at least one primary sensor, wherein the at least one primary sensor is configured to sense a designated stimulus and send an activation signal to at least one secondary sensor in its vicinity based on sensing the designated stimulus.

20. The method of claim 17, further comprising:
disconnecting a communication link between the controller and at least one network node.

21. The method of claim 17, further comprising:
monitoring health status and performance of a first sensor, wherein monitoring the health status and performance of a first sensor comprises monitoring RF signal strength of the first sensor, monitoring power consumption of the first sensor, monitoring power state of the first sensor, monitoring response time of the first sensor, monitoring latency of the first sensor, and monitoring a thermal condition of the first sensor.

22. The method of claim 17, further comprising:
in response to determining that the variance range between the information collected by a first network node of the one or more network nodes and the information received from the at least two other network nodes does not satisfy the specified threshold, re-authenticating the first network node, and restricting, without terminating, the participation of the first network node in the surveillance network in response to determining that the first network node does not meet a desired performance profile.

23. The method of claim 17, wherein each network node of a set of three or more network nodes comprises a temperature sensor configured to measure a temperature within the vicinity, wherein the common factor of the environment is the temperature within the vicinity, the method further comprising:
in response to determining that information relating to the temperature within the vicinity collected from the first network node is outside of the tolerance range of the information relating to the temperature within the vicinity collected from the set of three network nodes within the vicinity, restricting participation of the first network node.

24. A surveillance network comprising:
a controller configured to:
for each of a plurality of sensors within the surveillance network,
select a sensor from among the plurality of sensors within the surveillance network, and
determine a best route to disseminate one or more configuration updates to the selected sensor within the surveillance network at least in part by:
defining multiple routes between the controller and the selected sensor within the surveillance network, and
selecting the best route from among the defined multiple routes between the controller and the selected sensor within the surveillance network to disseminate the one or more configuration updates to the selected sensor within the surveillance network; and
wherein each of the plurality of sensors is configured to collect information from its environment and transmit the collected information to the controller,
wherein at least one of the plurality of sensors is configured to perform computation functions for at least one other sensor of the plurality of sensors, and
wherein each of the plurality of sensors is programmed with a unique serial number;
wherein the controller is configured to, in response to communication from a sensor of the plurality of sensors:
authenticate a given sensor based on an RF signature of the given sensor,
compare information collected by a first sensor of the plurality of sensors to information collected from a set of sensors located in the vicinity of the first sensor,
based on the comparison, determine whether the information collected by the first sensor is outside of a tolerance range, and
in response to determining that the information collected by the first sensor is outside of the tolerance range,
attempt to re-authenticate the first sensor, and
in response to determining that the first sensor cannot be re-authenticated, terminate or restrict the first sensor's participation in the surveillance network in response to determining that the collected information is outside of the tolerance range.

25. The surveillance network of claim 24, wherein the controller is further configured to terminate or restrict the first sensor's participation in the surveillance network in response to determining that the collected information is outside of the tolerance range, by disconnecting a communication link between the controller and the first sensor.

26. The surveillance network of claim 24, wherein the controller is further configured to, after successfully re-authenticating the first sensor, query the first sensor for performance state information.

27. The surveillance network of claim 24, wherein the controller is further configured to use hierarchical routing protocols with table-driven optimizations to determine a best route for at least one sensor of the plurality of sensors within the surveillance network and wherein the controller is further configured to use table-driven routing to determine a best route for at least one sensor of the plurality of sensors within the surveillance network.

28. The surveillance network of claim 24, wherein the controller is further configured to:
in response to determining that the first sensor cannot be re-authenticated,
terminate or restrict the first sensor's participation in the surveillance network.

* * * * *